United States Patent
Sigler et al.

(10) Patent No.: US 10,376,984 B2
(45) Date of Patent: Aug. 13, 2019

(54) CONICAL SHAPED CURRENT FLOW TO FACILITATE DISSIMILAR METAL SPOT WELDING

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 509 days.

(21) Appl. No.: 14/673,106

(22) Filed: Mar. 30, 2015

(65) Prior Publication Data

US 2016/0288242 A1    Oct. 6, 2016

(51) Int. Cl.
    *B23K 103/20*    (2006.01)
    *B23K 11/20*    (2006.01)
    *B23K 11/11*    (2006.01)

(52) U.S. Cl.
    CPC ............ *B23K 11/115* (2013.01); *B23K 11/20* (2013.01); *B23K 2103/20* (2018.08)

(58) Field of Classification Search
    CPC ... B23K 11/115; B23K 11/20; B23K 2103/20; B23K 11/3009; B23K 2101/18; B23K 2103/04; B23K 11/185; B23K 11/11
    USPC ............ 219/118, 91.2, 117.1, 86.1, 121.14, 219/121.35, 127, 137 R, 78.01; 228/262.41, 262.5
    See application file for complete search history.

(56) References Cited

U.S. PATENT DOCUMENTS

| | | | |
|---|---|---|---|
| 7,850,059 B2 | 12/2010 | Kobayashi et al. | |
| 7,935,908 B2 | 5/2011 | Nakagawa et al. | |
| 7,951,465 B2 * | 5/2011 | Urushihara | B23K 11/20 219/136 |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |

(Continued)

FOREIGN PATENT DOCUMENTS

| | | |
|---|---|---|
| CN | 105312755 A | 2/2016 |
| CN | 106041284 A | 10/2016 |
| JP | 11342477 | 12/1999 |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Dana Ross
*Assistant Examiner* — Joseph M Baillargeon
(74) *Attorney, Agent, or Firm* — Reising Ethington P.C.

(57) ABSTRACT

A method of resistance spot welding a workpiece stack-up that includes a steel workpieces and an aluminum alloy workpiece that overlie and contact one another to establish a faying interface at a weld site is disclosed. The method comprises passing a DC electrical current through the workpiece stack-up at the weld site and causing the current to assume a conical flow pattern. The conical flow pattern has a path of current flow that expands along a direction leading from a first welding electrode in electrical communication with the steel workpiece towards a second welding electrode in electrical communication with the aluminum alloy workpiece.

6 Claims, 3 Drawing Sheets

(56) References Cited

U.S. PATENT DOCUMENTS

| | | |
|---|---|---|
| 8,487,206 B2 | 7/2013 | Urushihara et al. |
| 2013/0189023 A1 | 7/2013 | Spinella |
| 2014/0360986 A1 | 12/2014 | Sigler et al. |
| 2015/0053654 A1 | 2/2015 | Sigler et al. |
| 2015/0053655 A1 | 2/2015 | Sigler et al. |
| 2015/0083693 A1 | 3/2015 | Schroth et al. |
| 2015/0096961 A1 | 4/2015 | Carlson et al. |
| 2015/0096962 A1 | 4/2015 | Sigler et al. |
| 2015/0231729 A1 | 8/2015 | Yang et al. |
| 2015/0231730 A1 | 8/2015 | Yang et al. |
| 2015/0352658 A1 | 12/2015 | Yang et al. |
| 2015/0352659 A1 | 12/2015 | Sigler et al. |
| 2016/0016252 A1* | 1/2016 | Edwards, II ............ B23K 11/24 219/91.1 |
| 2016/0279732 A1 | 9/2016 | Sigler et al. |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Wang et al., U.S. Appl. No. 14/561,746 entitled "Resistance Spot Welding Steel and Aluminum Workpieces with Electrode Insert," filed Dec. 5, 2014.

Sigler et al., U.S. Appl. No. 14/722,563 entitled "Resistance Spot Welding Workpiece Stack-Ups of Different Combinations of Steel Workpieces and Aluminum Workpieces," filed May 27, 2015.

Yang et al., U.S. Appl. No. 14/792,656 entitled "Cooling to Control Thermal Stress and Solidification for Welding of Dissimilar Materials," filed Jul. 7, 2015.

Sigler et al., U.S. Appl. No. 14/883,249 entitled "Multi-State Resistance Spot Welding Method for Workpiece Stack-Up Having Adjacent Steel and Aluminum Workpieces," filed Oct. 14, 2015.

Yang et al., U.S. Appl. No. 14/962,866 entitled "Welding Electrode for Use in Resistance Spot Welding Workpiece Stack-Ups that Include an Aluminum Workpiece and a Steel Workpiece," filed Dec. 8, 2015.

Sigler et al., U.S. Appl. No. 15/097,821 entitled "Resistance Spot Welding Steel and Aluminum Workpieces with Electrode Having Insert," filed Apr. 13, 2016.

Sigler et al., U.S. Appl. No. 15/137,778 entitled "External Heat Assisted Welding of Dissimilar Metal Workpieces," filed Apr. 25, 2016.

\* cited by examiner

CONICAL SHAPED CURRENT FLOW TO FACILITATE DISSIMILAR METAL SPOT WELDING

TECHNICAL FIELD

The technical field of this disclosure relates generally to resistance spot welding and, more particularly, to resistance spot welding a steel workpiece and an aluminum alloy workpiece.

BACKGROUND

Resistance spot welding is a process used by a number of industries to join together two or more metal workpieces. The automotive industry, for example, often uses resistance spot welding to join together pre-fabricated metal workpieces during the manufacture of a vehicle door, hood, trunk lid, or lift gate, among others. A number of spot welds are typically formed along a peripheral edge of the metal workpieces or some other bonding region to ensure the part is structurally sound. While spot welding has typically been practiced to join together certain similarly-composed metal workpieces—such as steel-to-steel and aluminum alloy-to-aluminum alloy—the desire to incorporate lighter weight materials into a vehicle body structure has generated interest in joining steel workpieces to aluminum alloy workpieces by resistance spot welding. The ability to resistance spot weld these dissimilar metal workpieces would promote production flexibility and reduce manufacturing costs since many vehicle assembly plants already have spot welding infrastructures in place. The aforementioned desire to resistance spot weld dissimilar metal workpieces is not unique to the automotive industry; indeed, it extends to other industries that may utilize spot welding as a joining process including the aviation, maritime, railway, and building construction industries, among others.

Resistance spot welding, in general, relies on the resistance to the flow of an electrical current through overlapping metal workpieces and across their faying interface(s) to generate heat. To carry out such a welding process, a set of two opposed spot welding electrodes is aligned on opposite sides of the workpiece stack-up, which typically includes two or more metal workpieces arranged in lapped configuration, at a predetermined weld site. An electrical current is then passed through the metal workpieces from one welding electrode to the other. Resistance to the flow of this electrical current generates heat within the metal workpieces and at their faying interface(s). When the workpiece stack-up includes a steel workpiece and an adjacent aluminum alloy workpiece, the heat generated at the faying interface and within the bulk material of those dissimilar metal workpieces initiates and grows a molten aluminum alloy weld pool that extends into the aluminum alloy workpiece from the faying interface. This molten aluminum alloy weld pool wets the adjacent faying surface of the steel workpiece and, upon cessation of the current flow, solidifies into a weld nugget that forms all or part of a weld joint that bonds the two workpieces together.

In practice, however, spot welding a steel workpiece to an aluminum alloy workpiece is challenging since a number of characteristics of those two metals can adversely affect the strength—most notably the peel strength—of the weld joint. For one, the aluminum alloy workpiece usually contains one or more mechanically tough, electrically insulating, and self-healing refractory oxide layers on its surface. The oxide layer(s) are typically comprised of aluminum oxides, but may include other metal oxide compounds as well, including magnesium oxides when the aluminum alloy workpiece is composed of a magnesium-containing aluminum alloy. As a result of their physical properties, the refractory oxide layer(s) have a tendency to remain intact at the faying interface where they can hinder the ability of the molten aluminum alloy weld pool to wet the steel workpiece. Efforts have been made in the past to remove the oxide layer(s) from the aluminum alloy workpiece prior to spot welding. Such removal practices can be unpractical, though, since the oxide layer(s) have the ability to regenerate in the presence of oxygen, especially with the application of heat from spot welding operations.

The steel workpiece and the aluminum alloy workpiece also possess different properties that tend to complicate the spot welding process. Specifically, steel has a relatively high melting point (~1500° C.) and relatively high electrical and thermal resistivities, while the aluminum alloy material has a relatively low melting point (~600° C.) and relatively low electrical and thermal resistivities. As a result of these physical differences, most of the heat is generated in the steel workpiece during current flow. This heat imbalance sets up a temperature gradient between the steel workpiece (higher temperature) and the aluminum alloy workpiece (lower temperature) that initiates rapid melting of the aluminum alloy workpiece. The combination of the temperature gradient created during current flow and the high thermal conductivity of the aluminum alloy workpiece means that, immediately after the electrical current ceases, a situation occurs where heat is not disseminated symmetrically from the weld site. Instead, heat is conducted from the hotter steel workpiece through the aluminum alloy workpiece towards the welding electrode in contact with the aluminum alloy workpiece, which creates a steep thermal gradient between the steel workpiece and that particular welding electrode.

The development of a steep thermal gradient between the steel workpiece and the welding electrode in contact with the aluminum alloy workpiece is believed to weaken the integrity of the resultant weld joint in two primary ways. First, because the steel workpiece retains heat for a longer duration than the aluminum alloy workpiece after the electrical current has ceased, the molten aluminum alloy weld pool solidifies directionally, starting from the region nearest the colder welding electrode (often water cooled) associated with the aluminum alloy workpiece and propagating towards the faying interface. A solidification front of this kind tends to sweep or drive defects—such as gas porosity, shrinkage voids, micro-cracking, and surface oxide residue—towards and along the faying interface within the weld nugget. Second, the sustained elevated temperature in the steel workpiece promotes the growth of brittle Fe—Al intermetallic compounds at and along the faying interface. The intermetallic compounds tend to form thin reaction layers between the weld nugget and the steel workpiece. These intermetallic layers, if present, are generally considered part of the weld joint in addition to the weld nugget. Having a dispersion of weld nugget defects together with excessive growth of Fe—Al intermetallic compounds along the faying interface tends to reduce the peel strength of the final weld joint.

In light of the aforementioned challenges, previous efforts to spot weld a steel workpiece and an aluminum-based workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners such as self-piercing rivets and flow-drill screws have predominantly been used instead. Such mechanical fasteners, however, take much longer to put in place and have high consumable costs compared to spot welding. They also add weight to the vehicle body structure—weight that is avoided when joining is accomplished by way of spot welding—that offsets some of the weight savings attained through the use of aluminum alloy workpieces in the first place. Advancements in spot welding that would make the process more capable of joining steel and aluminum alloy workpieces would thus be a welcome addition to the art.

SUMMARY OF THE DISCLOSURE

A method of resistance spot welding a workpiece stack-up that includes overlying and contacting steel and aluminum alloy workpieces is disclosed. The disclosed method includes providing the stack-up so that a faying surface of the steel and a faying surface of the aluminum alloy workpiece contact one another to establish a faying interface. Then, at a weld site, a first welding electrode is brought into electrical communication with the steel workpiece and a second welding electrode is brought into electrical communication with the aluminum alloy workpiece. The first and second welding electrodes confront each other at the weld site. A DC electrical current is then passed through the workpiece stack-up and between the first and second welding electrodes to initiate and grow a molten aluminum alloy weld pool within the aluminum alloy workpiece. Eventually, passage of the DC electrical current between the first and second welding electrodes is ceased, at which time the molten aluminum alloy weld pool solidifies into a weld joint that bonds the steel and aluminum alloy workpieces together at their faying interface.

The first and second welding electrodes may be brought into electrical communication with their respective workpieces in myriad ways. For instance, in one embodiment, the first welding electrode may be directly pressed against an accessible exterior surface of the steel workpiece and the second welding electrode may be pressed against an accessible exterior surface of the aluminum alloy workpiece. As another example, an electrically conductive intermediate member may be disposed between the first welding electrode and the accessible exterior surface of the steel workpiece, between the second welding electrode and the accessible exterior surface of the aluminum alloy workpiece, or between both welding electrodes and their respective accessible exterior workpiece surfaces. Of course, other ways of bringing each of the first and second welding electrodes into electrical communication with the steel and aluminum alloy workpieces, respectively, can be employed so long as electrical current can flow between the electrode and its associated workpiece.

In order to improve the strength—particularly the peel strength—of the weld joint formed between the steel an aluminum alloy workpieces, the DC electrical current is caused to assume a conical flow pattern in which the path of current flow expands radially along a direction leading from the first welding electrode towards the second welding electrode such that the current density of the DC electrical current decreases along that direction within at least a portion of the workpiece stack-up spanning from within the steel workpiece, across the faying interface, and into the aluminum alloy workpiece. The difference in current density triggered by inducement of the conical flow pattern concentrates heat within a smaller zone within steel workpiece as compared to the aluminum alloy workpiece. This creates temperature gradients or enlarges already-existing temperature gradients around the molten aluminum weld pool during current flow that, in turn, promotes solidification of the weld pool in a way that supports a stronger weld joint.

DETAILED DESCRIPTION

Figure 1:
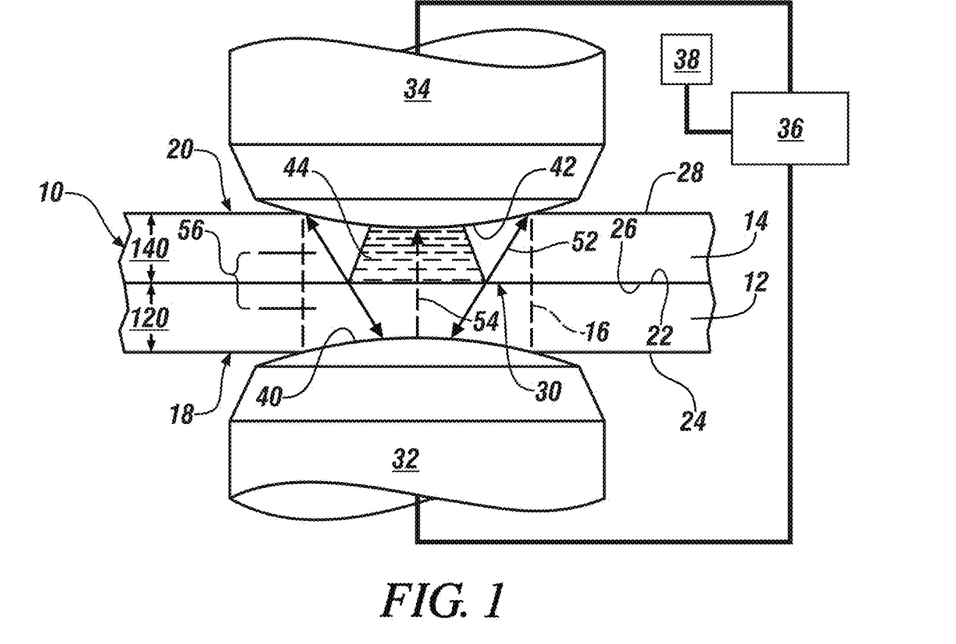
FIG. 1 is a general cross-sectional view of a workpiece stack-up, which includes a steel workpiece and an aluminum alloy workpiece, as well as a pair of opposed welding electrodes that are passing a DC electrical current through the workpiece stack-up in accordance with the present disclosure.
Figure 2:
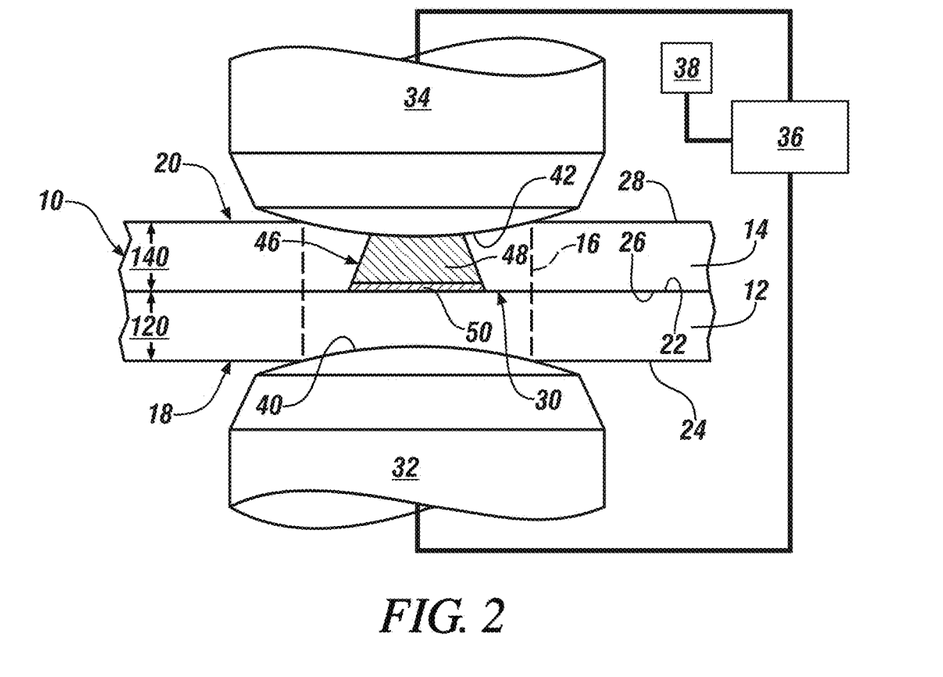
FIG. 2 is a general cross-sectional view of the workpiece stack-up shown in FIG. 1 after passage of the DC electrical current has ceased and a weld joint that bonds the steel workpiece and the aluminum alloy workpiece together has formed.

A method of resistance spot welding a workpiece stack-up 10 that includes dissimilar metal workpieces is illustrated in FIGS. 1-2. The workpiece stack-up 10, for instance, as discussed here, includes a steel workpiece 12 and an aluminum alloy workpiece 14 that overlie and contact one another at a weld site 16 where spot welding is intended to be practiced. The steel and aluminum alloy workpieces 12, 14 respectively provide first and second sides 18, 20 of the workpiece stack-up 10 that are accessible to a weld gun (not shown) of any suitable type. And, although not shown in FIGS. 1-2, the workpiece stack-up 10 could include additional workpieces, if desired, such as a second steel workpiece situated between the workpieces 12, 14 to prepare a stack-up totaling three workpieces, among other possibilities. The term "workpiece" and its steel and aluminum alloy variations is used broadly in this description to refer to any resistance spot weldable material including, but not limited to, a rolled sheet metal layer, a casting, or an extrusion, among others, inclusive of any surface layers that may optionally be present.

The steel workpiece 12, for example, includes a steel substrate that can be galvanized (i.e., zinc coated), aluminum coated, or bare (i.e., uncoated). The coated or uncoated steel substrate may be composed of any of a wide variety of steels including a low carbon steel (also referred to as mild steel), an interstitial-free (IF) steel, a high-strength low-alloy (HSLA) steel, or an advanced high strength steel (AHSS) such as dual phase (DP) steel, transformation-induced plasticity (TRIP) steel, twinning-induced plasticity (TWIP) steel, complex-phase (CP) steel, martensitic (MART) steel, hot-formed (HF) steel, and press-hardened (PHS) steel. The steel workpiece 12 has a thickness 120 that preferably ranges from 0.3 mm and 6.0 mm, from 0.5 mm to 4.0 mm, or more narrowly from 0.6 mm to 2.5 mm, at least at the weld site 16.

The aluminum alloy workpiece 14 includes an aluminum alloy substrate that may be coated or bare (i.e., no natural or applied surface coatings). The coated or uncoated aluminum alloy substrate may be composed of an aluminum-magnesium alloy, an aluminum-silicon alloy, an aluminum-magnesium-silicon alloy, or an aluminum-zinc alloy. The aluminum alloy substrate, for example, may be composed of a 4xxx, 5xxx, 6xxx, or 7xxx series wrought aluminum alloy sheet layer, or a 4xx.x, 5xx.x, or 7xx.x series aluminum alloy casting, and may further be employed in a variety of tempers including annealed (O), strain hardened (H), and solution heat treated (T). Some more specific kinds of aluminum alloys that can be used as the aluminum alloy substrate include, but are not limited to, 5754 aluminum-magnesium alloy, 6022 aluminum-magnesium-silicon alloy, 7003 aluminum-zinc alloy, and Al-10Si—Mg aluminum die casting alloy. In addition, these and other suitable aluminum alloys may be coated with their natural refractory oxide layer(s), zinc, or a conversion coating, and weld-through adhesives or sealers that are normally used in resistance spot welding operations may also be present. The aluminum alloy workpiece 14 has a thickness 140 that preferably ranges from 0.3 mm to about 6.0 mm, from 0.5 mm to 4.0 mm, and more narrowly from 0.5 mm to 3.0 mm, at least at the weld site 16.

When stacked-up for spot welding, the steel workpiece 12 includes a faying surface 22 and an accessible exterior surface 24. Likewise, the aluminum alloy workpiece 14 includes a faying surface 26 and an accessible exterior surface 28. The faying surfaces 22, 26 of the two workpieces 12, 14 overlap and contact one another to establish a faying interface 30 at the weld site 16. The faying interface 30, as used herein, encompasses instances of direct contact between the faying surfaces 22, 26 of the steel and aluminum alloy workpieces 12, 14 as well as instances of indirect contact in which the faying surfaces 22, 26 are not touching but are in close enough proximity to each another—such as when a thin layer of adhesive, sealer, or some other intermediate material is present—that resistance spot welding can still be practiced. The accessible exterior surfaces 24, 28 of the steel and aluminum alloy workpieces 12, 14, on the other hand, generally face away from each other in opposite directions and constitute the first and second sides 18, 20 of the workpiece stack-up 10.

During resistance spot welding of the workpiece stack-up 10, a first welding electrode 32 and a second welding electrode 34 are used to pass a DC electrical current through the workpiece stack-up 10 and across the faying interface 30 of the two workpieces 12, 14 at the weld site 16. Each of the first and second welding electrodes 32, 34 is carried by a separate gun arm (not shown) of a weld gun such as a C-type or an X-type weld gun. The two gun arms are operable to retractably converge or pinch the welding electrodes 32, 34 towards each another and to impose a clamping force on the electrodes 32, 34 that usually ranges between 400 lb and 2000 lb when the electrodes 32, 34 bear against opposed surfaces. The weld gun, moreover, is typically associated with a power supply 36 that provides DC electrical current for passage between the first and second welding electrodes 32, 34, often by way of the gun arms. A weld controller 38 may interface with the power supply 36 to control passage of the DC electrical current in accordance with a programmed weld schedule. And since the passage of current between the workpiece stack-up 10 and the welding electrodes 32, 34 generates significant heat, coolant lines or conduits that circulate a coolant, such as water, through the first and second welding electrodes 32, 34 during spot welding events are also typically provided on or by the gun arms of the weld gun.

At the onset of the resistance spot welding method, and with reference generally to FIG. 1, the workpiece stack-up 10 is located between the first welding electrode 32 and the second welding electrode 34. Each of the first and second welding electrodes 32, 34 is brought into electrical communication with its respective workpieces 12, 14 by operation of the weld gun such that a first weld face 40 of the first welding electrode 32 is axially aligned with a second weld face 42 of the second welding electrode 34. A number of options exist for achieving electrical communication between each welding electrode 32, 34 and its respective workpiece 12, 14. For example, in one embodiment, the first weld face 40 of the first welding electrode 32 may be pressed directly against the accessible exterior surface 24 of the steel workpiece 12, and the second weld face 42 of the second welding electrode 34 may be pressed directly against the accessible exterior surface 28 of the aluminum alloy workpiece 14. In other embodiments, an electrically conductive intermediate member may be disposed between the first weld face 40 of the first welding electrode 32 and the accessible exterior surface 24 of the steel workpiece 12 and/or between the second weld face 42 of the second welding electrode 34 and the accessible exterior surface 28 of the aluminum alloy workpiece 14. The electrically conductive intermediate member may be a tape, a welding electrode cover attached to the electrode that masks its weld face, a cover plate that is clamped between the welding electrode and the workpiece, or any other suitable member so long as electrical current can flow between the electrode and its associated workpiece.

After the first and second welding electrodes 32, 34 are in place and have established electrical communication with the steel and aluminum alloy workpieces 12, 14, respectively, a DC electrical current is passed through the workpiece stack-up 10 and between the confronting and axially aligned weld faces 40, 42 of the welding electrodes 32, 34, as depicted in FIG. 1. Passage of the DC electrical current quickly generates heat within the more electrically and thermally resistive steel workpiece 12 and at the faying interface 30, which results in the initiation and growth of a molten aluminum alloy weld pool 44 within the aluminum alloy workpiece 14. The molten aluminum alloy weld pool 44 wets the adjacent faying surface 22 of the steel workpiece 12 and penetrates into the aluminum alloy workpiece 14 from the faying interface 30. More specifically, the molten aluminum alloy weld pool 44 penetrates a distance that typically ranges from 20% to 100% (i.e., all the way through the workpiece 14) of the thicknesses 140 of the aluminum alloy workpiece 14 at the weld site 16.

The DC electrical current may be delivered for passage between the welding electrodes 32, 34 by the power supply 36 as controlled by the weld controller 38. The power supply 36 is preferably a medium-frequency direct current (MFDC) inverter power supply that delivers DC electrical current for exchange between the first welding electrode 32 and the second welding electrodes 34, although other types of power supplies can certainly be used. The weld controller 38 controls the power supply 36 by dictating the manner in which DC electrical current is exchanged between the welding electrodes 32, 34 based on programmed instructions including a prescribed weld schedule. The programmed characteristics of the DC electrical current may command the DC electrical current to have a constant current level or be pulsed over time, or some combination of the two, and typically call for the current level to be maintained mostly between 5 kA and 50 kA from commencement to cessation and to last for a duration of 40 ms to 2,500 ms in order to grow the molten aluminum alloy weld pool 44 to its desired size.

After passage of the DC electrical current between the weld face 40 of the first welding electrode 32 and the weld face 42 of the second welding electrode 34 ceases, the molten aluminum alloy weld pool 44 solidifies into a weld joint 46 that bonds the steel workpiece 12 and the aluminum alloy workpiece 14 together at the weld site 16, as illustrated in FIG. 2. The weld joint 46 includes an aluminum alloy weld nugget 48 and, usually, one or more Fe—Al intermetallic layers 50. The aluminum alloy weld nugget 48 extends into the aluminum alloy workpiece 14 to a distance that often ranges from 20% to 100% (i.e., full penetration) of the thickness 140 of the aluminum alloy workpiece 140 at the weld site 16, just like the pre-existing molten aluminum alloy weld pool 44. The one or more Fe—Al intermetallic layers 50 are situated between the aluminum alloy weld nugget 48 and the faying surface 22 of the steel workpiece 12 at the faying interface 30. This layer or layers 50 is generally formed as a result of a reaction between the molten aluminum alloy weld pool 44 and the steel workpiece 12 during current flow and for a short period of time after current flow has ceased when the steel workpiece 12 is still hot. The one or more Fe—Al intermetallic layers 50 can include $FeAl_3$, $Fe_2Al_5$, and other compounds, and typically have a combined thickness (i.e., total thickness of all intermetallic layers) of about 1 μm to about 5 μm when measured in the same direction as the thicknesses 120, 140 of the two workpieces 12, 14.

In order to enhance the strength of the weld joint 46 formed between the steel and aluminum alloy workpieces 12, 14, the DC electrical current that is passed through the workpiece stack-up 10 at the weld site 16 is caused to assume a conical flow pattern 52, as illustrated in FIG. 1. The conical flow pattern 52 has a path of current flow that expands along a direction 54 leading from the first welding electrode 32 towards the second welding electrode 34 such that the current density of the DC electrical current decreases along that direction 54 within at least a of the workpiece stack-up 10 spanning from within the steel workpiece 12, across the faying interface 30, and into the aluminum alloy workpiece 14. In fact, as shown here, the conical flow pattern 52 may extend all the way from the accessible exterior surface 24 of the steel workpiece 12 to the accessible exterior surface 28 of the aluminum alloy workpiece 14 such that its path of current flow expands radially from the accessible exterior surface 24 of the steel workpiece 12 to the accessible exterior surface 28 of the aluminum alloy workpiece 14. It should be noted that the direction 54 referred to above refers merely to the direction of radial expansion of the current flow path regardless of whether current is actually flowing from the first electrode 32 (assigned positive polarity) to the second electrode 34 (assigned negative polarity) or from the second electrode 34 (assigned positive polarity) to the first electrode 32 (assigned negative polarity).

The DC electrical current can be caused to assume a conical flow pattern 52 in a plurality of ways. The construction and material composition of the first and second welding electrodes 32, 34 and/or the geometry of the weld faces 40, 42 of the first and second welding electrodes 32, 34 can be tailored to induce the conical flow pattern 52. Moreover, an electrically conductive intermediate member placed between the first welding electrode 32 and the steel workpiece 12 and/or between the second welding electrode 34 and the aluminum alloy workpiece 14 can also induce the conical flow pattern 52 either alone or in combination with the construction/composition/weld face geometry possibilities just listed. However induced, in a preferred embodiment, the current density of the DC electrical current decreases from the accessible exterior surface 24 of the steel workpiece 12 to the accessible exterior surface 28 of the aluminum alloy workpiece 14 (i.e., the conical flow pattern 52 extends all the way between those surfaces 24, 28 and the path of current flow expands radially therebetween along direction 54) such that the current density at the accessible exterior surface 24 of the steel workpiece 12 is greater than the current density at the accessible exterior surface 28 of the aluminum alloy workpiece 14 by a ratio of 1.5:1 to 16:1 or more narrowly a ratio of 1.5:1 to 5:1.

One particular way that can be employed to induce the conical flow pattern 52 is to provide the second welding electrode 34 with a hole or depression at the center of the weld face 42. The weld faces 40, 42 of the first and second welding electrodes 32, 34 can also be sized and shaped so that the weld face 42 of the second welding electrode 34 forms a contact patch at the accessible exterior surface 28 of the aluminum alloy workpiece 14 during spot welding that is greater in surface area than a contact patch formed by the weld face 40 of the first welding electrode 32 at the accessible exterior surface 24 of the steel workpiece 12. This can be accomplished with or without an insert at the center of—and flush with—the weld face 42 that is more electrically resistive than a surrounding annular area of the weld face 42. Still further, as another option, a cover plate composed of an electrically conductive material may be clamped between the second welding electrode 34 and the aluminum alloy workpiece 14 and it may be sized to make contact with an area of the accessible outer surface 28 of the aluminum alloy workpiece 14 that is greater than an area of contact made between the weld face 40 of the first welding electrode 32 and the steel workpiece 12. Other mechanisms may of course be employed to induce the conical flow pattern 52. Indeed, some specific examples of ways to cause the DC electrical current to assume the conical flow pattern 52 are described in U.S. application Ser. Nos. 14/181,020, 14/503,504, 14/503,969, and 14/561,746, as well as U.S. Provisional Application Nos. 62/010,192, 62/010,204 and 62/139,197. Each of those documents is assigned to the Applicant of this application and is incorporated herein by reference in its entirety.

Figure 3:
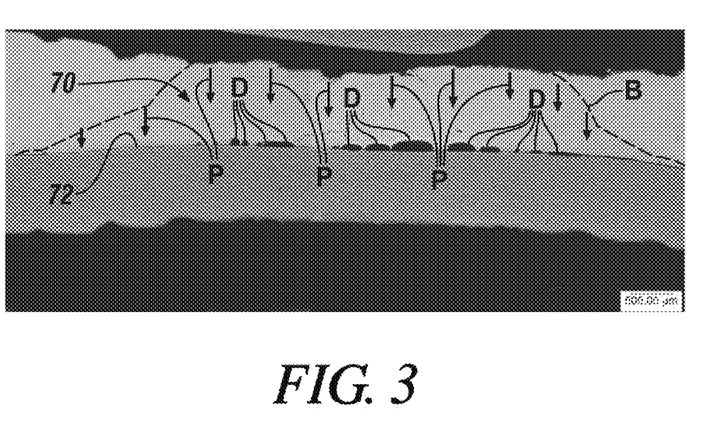
FIG. 3 is photomicrograph of a representative weld joint formed between a steel workpiece (bottom workpiece) and an aluminum alloy workpiece (top workpiece) by a conventional resistance spot welding process that does not induce a conical flow pattern in the DC electrical current used to form the weld joint.

The difference in current density within steel and aluminum alloy workpieces 12, 14 triggered by inducement of the conical flow pattern 52 is believed to improve the strength, most notably the peel strength, of the weld joint 46 by ultimately minimizing the unwanted accumulation of weld defects at and along the faying interface 30 of the workpiece stack-up 10. To provide some context, FIG. 3 shows a photomicrograph of a representative weld joint 70 formed between an aluminum alloy workpiece (top workpiece) and steel workpiece (bottom workpiece) by a conventional resistance spot welding process that does not induce a conical flow pattern in the DC electrical current used to form the weld joint 70. Here, weld defects D have been discovered at and along the faying interface 72. These weld defects D may include shrinkage voids, gas porosity, oxide residue, and micro-cracking, among others. When present and distributed along the faying interface 72, it is believed that the weld defects D may reduce the peel strength of the weld joint 70 and, more generally, may negatively impact and weaken the overall integrity of the joint 70.

Without being bound by theory, it is believed that the accumulation and distribution of the weld defects D at and along the faying interface 72 is due at least in part to the solidification behavior of the pre-existing molten aluminum alloy weld pool as it transforms into the weld joint 70. Specifically, a heat imbalance can develop between the much hotter steel workpiece (bottom workpiece) and the aluminum alloy workpiece (top workpiece) because of the dissimilar physical properties of the two materials—namely, the much greater thermal and electrical resistivities of the steel. The steel workpiece therefore acts as a heat source while the aluminum alloy workpiece acts as a heat conductor, creating a strong temperature gradient in the vertical direction that causes the molten aluminum alloy weld pool to cool and solidify from the region proximate the cooler (e.g., water cooled) welding electrode in contact with the aluminum alloy workpiece towards the faying interface 72. The path and direction of the solidification front is represented generally in FIG. 3 by arrows P and the boundary of the weld joint 70 is represented by broken lines B. As the solidification front progresses along path P, the weld defects D are drawn or swept toward the faying interface 72 and end up dispersed at and along the faying interface 72 within the weld joint 70.

Figure 4:
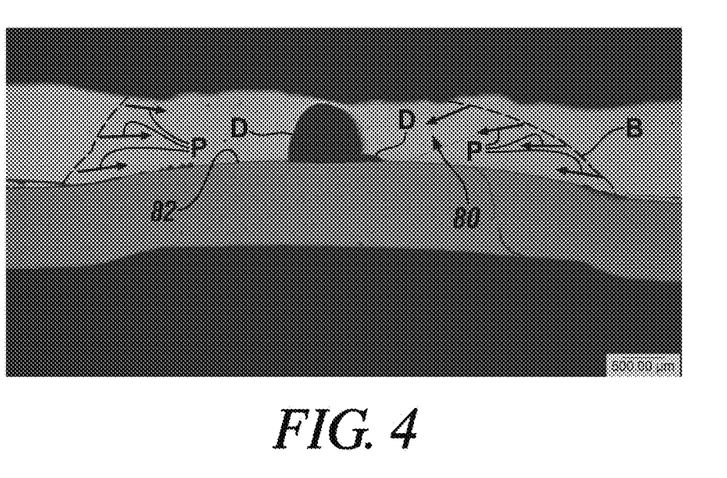
FIG. 4 is a photomicrograph of a weld joint that was formed between a steel workpiece and an aluminum alloy workpiece when the DC electrical current used to form the weld joint is caused to assume a conical flow pattern.

Referring now to FIGS. 1-2 and 4, causing the DC electrical current to assume the conical flow pattern 52 when being passed between the first and second welding electrodes 32, 34 works to avoid the broad and unwanted dispersal of weld defects towards and along the faying interface 30 within the weld joint 46 during solidification of the molten aluminum alloy weld pool 44. In particular, as a consequence of the conical flow pattern 52, in which the current density of the DC electrical current decreases along the direction 54 from within the steel workpiece 12 and into the aluminum alloy workpiece 14, heat is concentrated within a smaller zone in the steel workpiece 12 as compared to the aluminum alloy workpiece 14. The act of concentrating heat within a smaller zone in the steel workpiece 12 creates three-dimensional radial temperature gradients and/or enlarges already-existing three-dimensional radial temperature gradients acting within the planes of both workpieces 12, 14 and around the molten aluminum alloy weld pool 44. The creation and/or enlargement of such temperature gradients promotes lateral heat dissemination away from the molten aluminum alloy weld pool 44 within the planes of the workpieces 12, 14 (as opposed to directional heat extraction into the cooler welding electrode in contact with the aluminum alloy workpiece as in FIG. 3). The resultant enhanced temperature distribution surrounding the molten aluminum alloy weld pool 44 beneficially affects the cooling action of the molten aluminum alloy weld pool 44 as it solidifies into the weld joint 46, as will be described in more detail below with respect to FIG. 4, thus improving the strength of the weld joint 46, especially the peel strength.

Referring for the moment to the weld joint 80 shown in FIG. 4, instead of the solidification front progressing toward the faying interface 82 as the pre-existing molten aluminum alloy weld pool transforms into the weld joint 80, as is indicated in FIG. 3 and described above, the three-dimensional radial temperature gradients created and/or enlarged by the conical flow pattern 52 (FIG. 1) around the molten aluminum weld pool cause the weld pool to cool and solidify in a more lateral direction—that is, inward from its outer perimeter toward a central region of the weld joint 80. The path and direction of the solidification front is represented generally in FIG. 4 by arrows P and the boundary of the joint 80 is represented by broken arrows B. The path P is pointed toward the central region of the weld joint 80 and consequently draws or sweeps weld defects D towards the center of the weld joint 80 where they conglomerate and settle either away from the faying interface 82 or mainly at the faying interface 82 (as opposed to being dispersed broadly along the faying interface 82). The solidification behavior of the molten aluminum alloy weld pool just described and shown in FIG. 4 can be augmented by keeping the welding electrodes 32, 34 in electrical communication with their respective workpieces 12, 14 after cessation of the DC electrical current.

Figure 5:
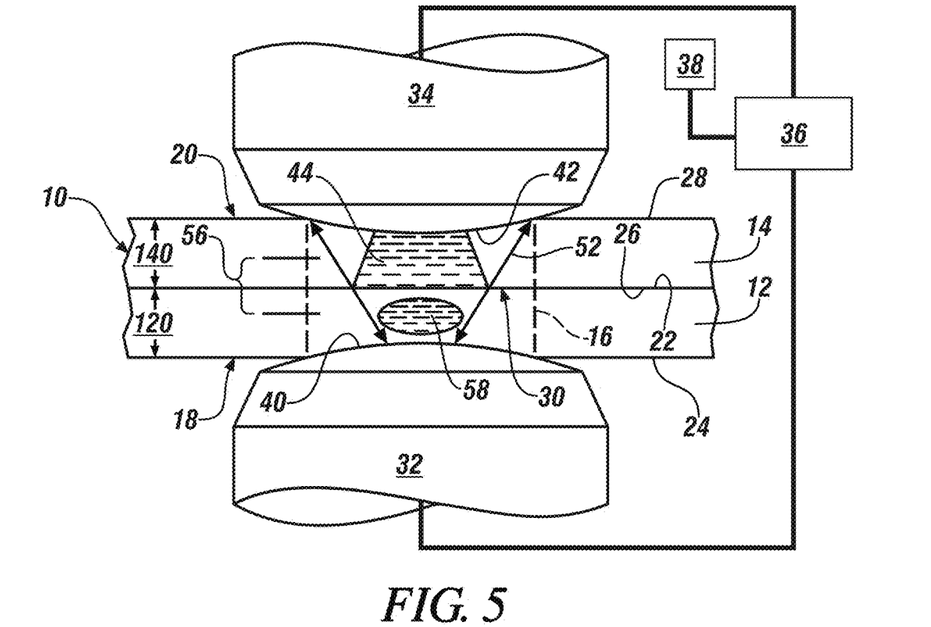
FIG. 5 is a general cross-sectional view of a workpiece stack-up, which includes a steel workpiece and an aluminum alloy workpiece, as well as a pair of opposed welding electrodes that are passing a DC electrical current through the workpiece stack-up in accordance with the present disclosure to initiate and grow a molten steel weld pool within the steel workpiece in addition to initiating and growing a molten aluminum alloy weld pool within the aluminum alloy workpiece.

Additionally, by inducing the conical flow pattern 52 so as to concentrate current within a smaller zone in the steel workpieces 12 (as compared to the aluminum alloy workpiece 14), a hot spot is essentially created within the steel workpiece 12 adjacent to the center of the molten aluminum alloy weld pool 44. And, because the steel workpiece 12 has a higher thermal resistivity that the aluminum alloy workpiece 14, the hot spot remains intact and actually heats the center of the molten aluminum alloy weld pool 44 at the faying interface 30 during solidification of the weld pool 44, thus helping the center of the weld pool 44 solidify last in the manner described above with respect to FIG. 4. In some instances, as shown in FIG. 5, the DC electrical current can be set aggressive enough—without softening the aluminum alloy workpiece 14 so much that the second welding electrode 34 plunges into the molten aluminum alloy weld pool 44—that a molten steel weld pool 58 is initiated and grown within the steel workpiece 12 adjacent to the molten aluminum alloy weld pool 44. Initiating and growing a steel weld pool within the steel workpiece 12 serves to maximize the "hot spot" heating affect that the steel workpiece 12 has on the center of the molten aluminum alloy weld pool 44 at the faying interface during solidification of the weld pool 44 into the weld joint 46.

Figure 6:
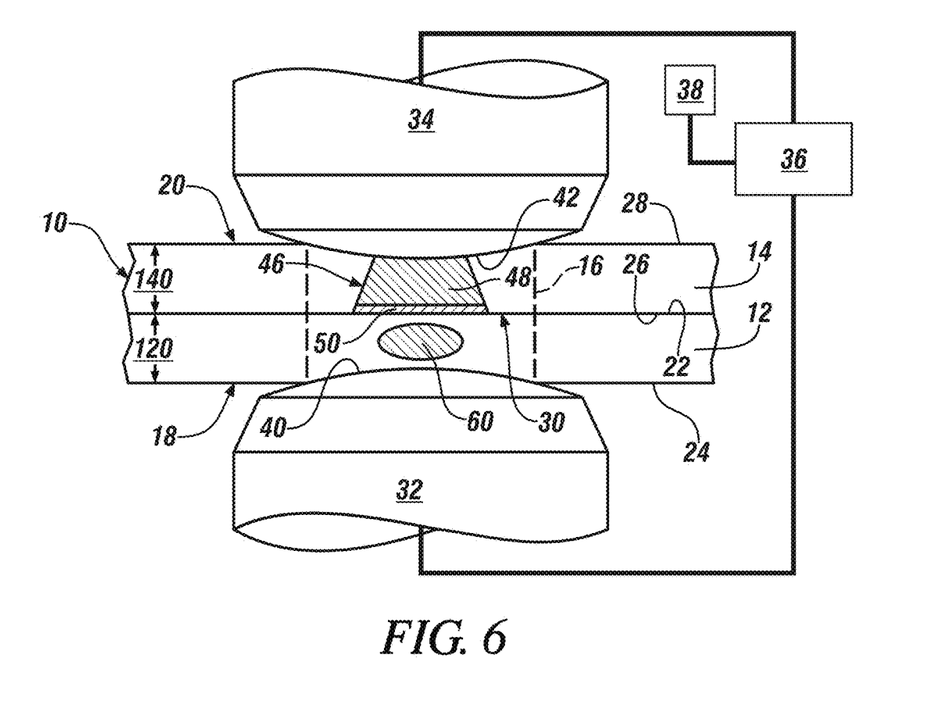
FIG. 6 is a general cross-sectional view of the workpiece stack-up shown in FIG. 5 after passage of the DC electrical current has ceased and a weld joint that bonds the steel workpiece and the aluminum alloy workpiece together has formed along with a steel weld nugget located within the steel workpiece.
Figure 7:
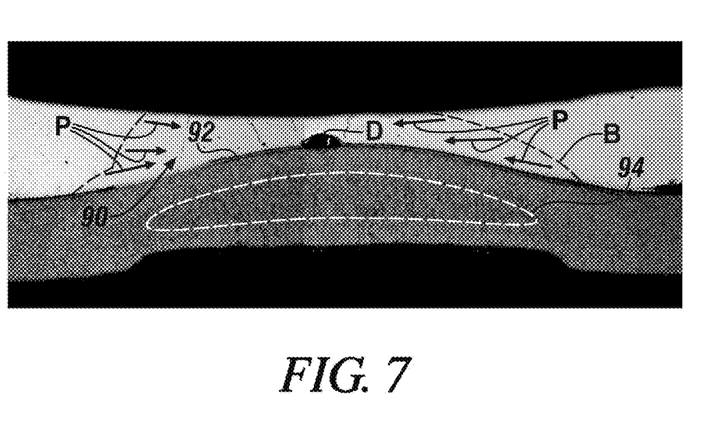
FIG. 7 is a photomicrograph of a weld joint that was formed between a steel workpiece and an aluminum alloy workpiece when the DC electrical current used to form the weld joint is caused to assume a conical flow pattern and a molten steel weld pool was initiated and grown within the steel workpiece.

If the molten steel weld pool 58 is initiated and grown, it preferably remains contained within the steel workpiece 12 and, accordingly, does not extend to either the faying surface 22 or the accessible exterior surface 24 of the steel workpiece 12. The molten steel weld pool 58 eventually solidifies into a steel weld nugget 60 within the steel workpiece 12 when passage of the DC electrical current between the first and second welding electrodes 32, 34 ceases, as depicted in FIG. 6. The creation of the molten steel weld pool 58 is believed to have a positive effect on the strength of the weld joint 46. Specifically, the creation of the molten steel weld pool 58 tends to distort the faying surface 22 of the steel workpiece 12 away from the accessible exterior surface 24. Such distortion can cause the steel workpiece 12 to thicken at the weld site 16 by as much as 50%. A photomicrograph of a weld joint 90 formed against a faying surface 92 of a steel workpiece (bottom workpiece) that has been thickened by the initiation and growth of a molten steel weld pool within the steel workpiece is shown in FIG. 7. In FIG. 7, the steel weld nugget that results from the creation of the molten steel weld pool has been identified with reference numeral 94.

The weld joint 90 shown in FIG. 7 benefited from the same molten aluminum alloy weld pool solidification behavior described above with respect to FIG. 4 as indicated by the agglomerated weld defects D that are present at a central region of the joint 90. The increase in the thickness of the steel workpiece (bottom workpiece) at the weld site is thought to contribute to such solidification behavior in addition to the three-dimensional radial temperature gradients that were created and/or enlarged by the conical flow pattern. To be sure, the increase in the thickness of the steel workpiece is believed to have helped maintain an elevated temperature at the center of the molten aluminum alloy weld pool 44 (FIG. 1)—allowing it to cool and solidify last—which further forced weld defects D to be drawn, swept, and merged towards the center of the weld joint 90.

Referring now back to FIGS. 5-6, the swelling of the faying surface 22 of the steel workpiece 12 is also thought to have other beneficial effects on the strength of the weld joint 46 not necessarily related to the temperature distribution in and around the molten aluminum alloy weld pool 44. For instance, the swelling of the faying surface 22 of the steel workpiece 12 can inhibit or disrupt formation of the one or more brittle Fe—Al intermetallic layers 50 (too small to be seen in FIG. 7) that tends to form at the faying interface 30. Still further, once the weld joint 46 is in service, the swelling of the faying surface 22 of the steel workpiece 12 can interfere with crack propagation around the weld joint 46 by deflecting cracks along a non-preferred path.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a workpiece stack-up that includes a steel workpiece and an aluminum alloy workpiece; the method comprising:
providing a workpiece stack-up that includes a steel workpiece and an aluminum alloy workpiece, the steel workpiece having a faying surface that overlies and contacts a faying surface of the aluminum alloy workpiece to establish a faying interface at a weld site;
bringing a first welding electrode into electrical communication with the steel workpiece at the weld site;
bringing a second welding electrode into electrical communication with the aluminum alloy workpiece at the weld site;
passing a DC electrical current through the workpiece stack-up at the weld site and between the first and second welding electrodes to initiate and grow a molten aluminum alloy weld pool within the aluminum alloy workpiece, the DC electrical current assuming a conical flow pattern in which a path of current flow expands radially along a direction leading from the first welding electrode towards the second welding electrode such that a current density of the DC electrical current decreases along the direction within at least a portion of the workpiece stack-up spanning from within the steel workpiece, across the faying interface, and into the aluminum alloy workpiece.

2. The method set forth in claim 1, wherein the aluminum alloy workpiece has a thickness that ranges from 0.5 mm to 4.0 mm at least at the weld site, and wherein the steel workpiece has a thickness that ranges from 0.5 mm to 4.0 mm at least at the weld site.

3. The method set forth in claim 1, further comprising:
ceasing passage of the DC electrical current through the workpiece stack-up at the weld site to allow the molten aluminum alloy weld pool to solidify into a weld joint that bonds the steel and aluminum alloy workpieces together at their faying interface, the weld joint including an aluminum alloy weld nugget.

4. The method set forth in claim 3, wherein the weld joint further comprises one or more Fe—Al intermetallic layers between the aluminum alloy weld nugget and the faying surface of the steel workpiece.

5. The method set forth in claim 1, wherein the second welding electrode is brought into electrical communication with the aluminum alloy workpiece by pressing the second welding electrode directly against the aluminum alloy workpiece at the weld site.

6. The method set forth in claim 1, wherein the steel workpiece includes an accessible exterior surface and the aluminum alloy workpiece includes an accessible exterior surface, and wherein the path of current flow of the conical flow pattern expands radially from the accessible exterior surface of the steel workpiece to the accessible exterior surface of the aluminum alloy workpiece such that current density of the DC electrical current decreases along the direction from the accessible exterior surface of the steel workpiece to the accessible exterior surface of the aluminum alloy workpiece.

* * * * *